United States Patent [19]

Appleberry

[11] Patent Number: 5,318,256
[45] Date of Patent: Jun. 7, 1994

[54] ROCKET DECELERATION SYSTEM

[75] Inventor: Walter T. Appleberry, Long Beach, Calif.

[73] Assignee: Rockwell International Corporation, Seal Beach, Calif.

[21] Appl. No.: 956,191

[22] Filed: Oct. 5, 1992

[51] Int. Cl.$^5$ .............................................. B64G 1/26
[52] U.S. Cl. ................................. 244/169; 244/3.22; 244/138 R; 244/160
[58] Field of Search ............... 244/164, 169, 171, 170, 244/172, 3.22, 138 R, 160

[56] References Cited

U.S. PATENT DOCUMENTS

| | | | |
|---|---|---|---|
| 3,034,434 | 5/1962 | Swain et al. | 244/3.22 |
| 3,093,346 | 6/1963 | Faget et al. | 244/3.22 |
| 3,606,212 | 9/1971 | Paine | 244/160 |
| 3,907,226 | 9/1975 | Neufeld et al. | 244/169 |
| 4,712,748 | 12/1987 | Schafer | 244/3.22 |
| 4,802,333 | 2/1989 | Smith | 244/169 |
| 4,848,706 | 7/1989 | Garg et al. | 214/169 |
| 4,928,906 | 5/1990 | Storm | 244/3.22 |
| 5,020,746 | 6/1991 | Anzel | 244/169 |

Primary Examiner—Galen L. Barefoot
Attorney, Agent, or Firm—Lawrence N. Ginsberg; Charles T. Silberberg

[57] ABSTRACT

A rocket deceleration system for a spacecraft, comprises a first set of active canted rockets for attenuating a horizontal velocity of the spacecraft and a portion of the vertical velocity thereof. A second set of active canted rockets attenuate the remainder of the vertical velocity. A third set of available canted rockets attenuate a wide range of horizontal velocities, regardless of the vehicle roll position about its vertical axis. The first set, second set and third set of rockets form a ring and combine to form a total number of rockets being divisible by the numeral 6. Each rocket is 180° from an opposing rocket on the other side of the ring. A programmable controller identifies rockets to be fired to attenuate horizontal and vertical spacecraft velocities. The controller operates by i) receiving external input data regarding horizontal and vertical spacecraft velocities and vehicle roll position; ii) comparing the input data to tabulated information correlating rocket position to horizontal spacecraft velocity and vehicle roll position; and, iii) issuing a fire command to the appropriate active rockets of the first set and second set at a predetermined height above the ground. The appropriate active rockets is a constant number if there are no flight anomalies. An appropriate command is issued for adding or removing at least one rocket to the constant number of active rockets without inducing undesired imbalances in thrust forces on the spacecraft.

4 Claims, 7 Drawing Sheets

MAXIMUM 53 FPS HORIZONTAL VELOCITY
24 ROCKETS: 12 ACTIVE, 12 AVAILABLE

EXAMPLE: MODERATE HORIZONTAL VELOCITY
$V_H$ = 26.888 FPS
24 ROCKETS: 12 ACTIVE, 12 AVAILABLE

MAXIMUM 53 FPS HORIZONTAL VELOCITY, ONE CHUTE FAILURE, FAILURE, $V_V$= 35 FPS, 24 ROCKETS: 13 ACTIVE, 11 AVAILABLE

EXAMPLE: MODERATE HORIZONTAL VELOCITY
$V_H$ = 26.888 FPS
ONE CHUTE FAILURE, $V_V$ = 35 FPS,
24 ROCKETS: 13 ACTIVE, 11 AVAILABLE

ROCKET DECELERATION SYSTEM

BACKGROUND OF THE INVENTION

1. Field of the Invention

The present invention relates to rocket deceleration systems and more particularly to the utilization of canted rockets for the attenuation of spacecraft velocity.

2. Description of the Related Art

Recovery of entry spacecraft from earth orbit has, for the United States, been accomplished by landing at sea, after deploying parachutes to reduce the vertical velocity to approximately 30 feet/second. Activities involved with the Assured Crew Return Vehicle (ACRV) Program involved the evaluation of land landing concepts. As will be described in details below, the present invention involves the use of retrorockets as the most promising approach to recovery of capsule-type vehicles, with the Apollo Spacecraft being an example. The key problem in such a re-entry technique was to fully attenuate both the vertical velocity, which is relatively constant at 30 fps, using three (Apollo) parachutes, and the horizontal velocity which was deemed to vary from zero to 53 fps (36 mph), depending on wind conditions. Other design criteria included the possibility that the vertical velocity could rise to 35 fps in the event of chute failure and 50 fps with two chutes out. Finally, an unlikely failure of one or two retrorockets could occur. It was decided that rotation of the capsule about its vertical (roll) axis would not be controlled. The goal, then, was to devise a retrorocket system that would respond to all of the variables: wind velocity, chute failures, and rocket failures, yet touch down at substantially zero vertical and horizontal velocities.

Prior art attempts to accomplish these goals were unsuccessful. For example, attempts have been made to slide on inflated bags across the landing site. But this would have required a prepared site, a constraint to be avoided, if possible. Also, the bags required tended to position the spacecraft so high above the ground that tipover of the entire assembly was considered a significant risk. Russia has successfully demonstrated ground landings for several years, using six rockets, but they can neither compensate for winds, nor can they land gently in order to accommodate a seriously ill crewman, or in spite of a failed chute. And last, crushable structures, such as honeycomb or foam were evealuated. Obviously, these would work only on a virtually windless day, with all chutes and rockets operating properly.

SUMMARY OF THE INVENTION

A solid rocket deceleration system for a spacecraft, suspended on multiple parachutes, provides attenuation of vertical and horizontal velocities to within 2.5 feet per second (fps) at touchdown. The rockets are identical, equally spaced, and canted such that the vertical and horizontal thrust components can be used to attenuate the spacecraft horizontal and vertical velocities, respectively. For a nominal mission, the vertical velocity is constant, and the horizontal is equal to the wind velocity. The latter is the first of three external data provided to a computer controlled rocket selection system. It includes a lookup table that lists wind velocities ranging, for example, from zero to 53 fps, in increments of 5 fps or less. Each listing can be attenuated to zero at touchdown. The computer selects the nearest listing, thus ensuring acceptably small touchdown errors of ±2.5 fps or less. The design requirement for the Assured Crew Return Vehicle (ACRV) was ±5 fps. For each listing, the Table identifies the rockets to be fired, and all fire simultaneously.

Since the rockets must fire in the wind direction, a second datum required by the computer is the angular difference between the wind direction and some reference line on the spacecraft, such as the line of sight of the forward facing crew. The effect is that the computer rotates the Table, such that the rocket horizontal deceleration force vector is aligned with the wind vector. The spacecraft does not rotate and, therefore, the crew could be facing in any direction relative to the wind vector. It can be seen that any of the rockets could be used for horizontal deceleration. This is why the rockets are equally spaced around the spacecraft. It means that the minimum number of rockets must be greater than the number of active rockets, the latter being a constant for nominal missions. Twelve (12) active rockets were used for ACRV, out of the total available. This minimum total must be sufficient to attenuate the zero to 53 fps range of horizontal velocities, in sufficiently small increments. While 18 rockets would meet this requirement, 24 were analyzed in greater detail and obviously provided increased performance, compensating for a number of other conditions not specified for ACRV. These include loss of two out of three chutes, loss of one or two rockets, and substantial changes in spacecraft weight.

The third datum is required only if one of the three chutes fails to deploy, thus increasing the vertical velocity, which requires the firing of one additional rocket. The addition of one rocket to the firing pattern, increasing the number for ACRV from 12 to 13 active rockets, must not affect the balance of forces on the spacecraft. There are two balanced patterns that differ by one: a 180-degree pair and a 120-degree triad. By disabling a 180-degree pair and enabling a 120-degree triad, a single rocket has been added without disturbing the balance of horizontal forces on the spacecraft. This 180/120 capability requires that the total number of rockets must be divisible by the numeral 6.

BRIEF DESCRIPTION OF THE DRAWINGS

The same elements or parts throughout the Figures are designated by the same reference characters.

DETAILED DESCRIPTION OF THE PREFERRED EMBODIMENTS

General Approach Logic

Figures 1, 2, 3, 4, 5:
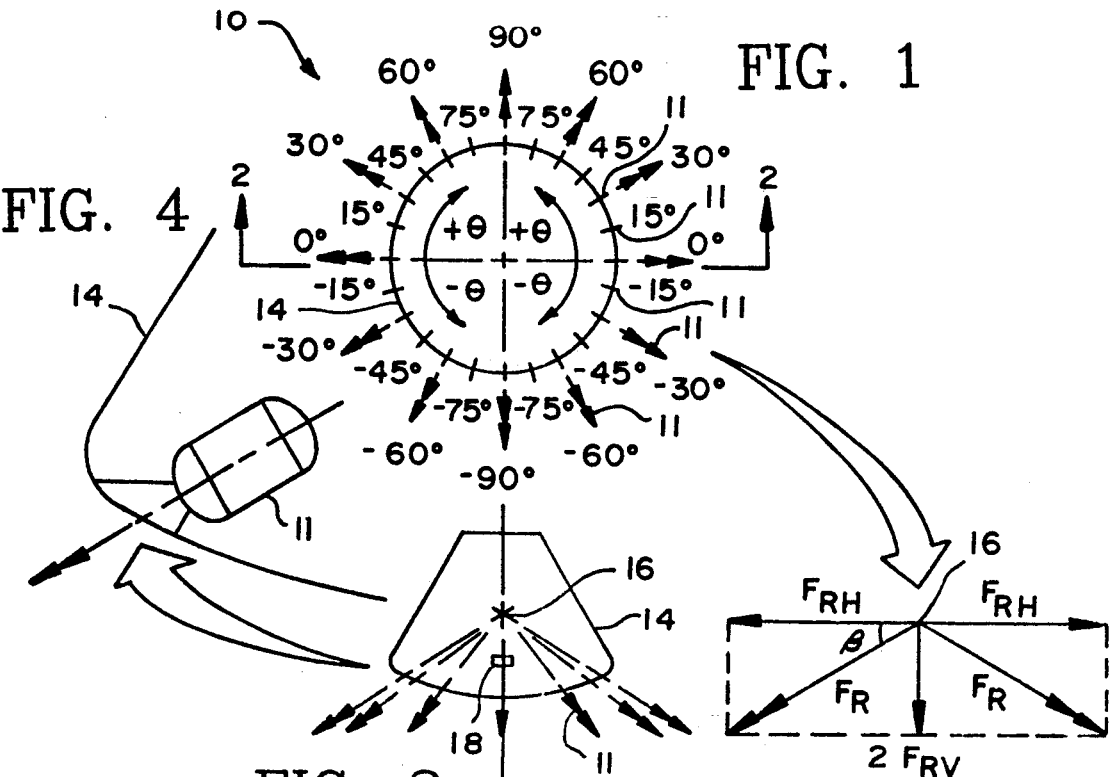
FIG. 1 is a schematic illustration of the top view of a 24-rocket configuration of the rocket deceleration system of the present invention, showing 12 active rockets.
FIG. 2 is a side schematic illustration of the rocket deceleration system of FIG. 1.
FIG. 3 is a bottom schematic illustration of the rocket deceleration system of the present invention.
FIG. 4 is an enlarged cross sectional view of a portion of the spacecraft, illustrating a rocket installed in that spacecraft.
FIG. 5 is a vector diagram of the rocket thrust force.

After investigating gimbaled liquid fueled rockets, cost considerations led to the preferred general concept: A ring of identical fixed solid rockets, equally spaced around the lower periphery of the capsule, and canted uniformly, such that their thrust axes intersect just above the center of gravity (CG) of the capsule. As propellant is consumed, the CG moves to just above the intersect point. The ring of rockets encircle the entire capsule because, while the roll position of the capsule relative to the horizontal (wind) velocity is known, it is not controllable. The cant angle, $\beta$, is driven by the maximum deceleration forces that can be tolerated by the crew: 2 G's horizontal and 10 G's vertical, the resultant of these being the axial rocket thrust, with the cant angle defined as $$\beta = \arcsin F_{RV}/F_R,$$

where $F_{RV}$ is the vertical component of the rocket thrust, and $F_R$ is the axial force. $\beta$ is measured from the horizontal. Since all active rockets fire simultaneously and for the same length of time (less than one second), it will be shown later that these constraints result in a vertical deceleration much lower (about 2 G's) than the maximum allowed (10 G's). This is considered both a safety margin and a feature likely to be favored by NASA. Different size rockets for vertical versus horizontal deceleration can be used but at substantially higher hardware and ground operations costs, and without discernible benefits.

Initial studies of the appropriate number of rockets led to a key innovation which requires the pattern to include a 120-degree 3-rocket group or triad, while also limiting the pattern to diametrically opposed rockets. This allows the firing pattern options to vary by one rocket while retaining completely balanced forces on the capsule. For example, changing the 3-rocket balanced pattern to a 4-rocket balanced pattern (two pairs diametrically opposed) increases the vertical force on the capsule, thus compensating for a failed chute, but without affecting the horizontal deceleration force. As a result of these findings, patterns of 18 and 24 rockets were studied in detail. Eighteen was generally favored for reasons of cost and structural volume, while 24 provided considerably increased mission flexibility, such as smaller increments between horizontal velocities that could be attenuated to zero. But the major benefit of the 24-rocket arrangement is its ability to compensate for unexpected growth in vehicle weight, along with its ability to handle a broader range of horizontal velocities in the presence of severe mission anomalies, such as the failure of two chutes or two rockets.

Horizontal deceleration is achieved by firing, principally, those rockets on the windward side of the capsule, i.e., in the direction of horizontal vehicle motion relative to the ground. These forces are unbalanced (their diametrically opposed rockets do not fire) as they must be, in order to decelerate the vehicle horizontally. The number of unbalanced rockets fired is a function of wind velocity, with sufficient choices available to ensure that horizontal touchdown velocities will not exceed 2.5 fps. A technique that contributes to this is the occasional use of unbalanced rockets on the lee side of the vehicle, in addition to those on the windward side, the partially canceling effect resulting in a net deceleration not obtainable with the windward rockets alone. Whether on the windward or lee side, these unbalanced rockets are fired in pairs or groups of pairs that are symmetrically disposed about the vehicle centerline containing the horizontal velocity vector, i.e., that centerline along which the vehicle moves. Assuming no failures, the total number of active rockets is a constant, since the vertical velocity of 30 fps is assumed constant. For the nominal mission, whether involving 18 or 24 rockets, the number of active rockets is 12. In the event of one chute failure (35 fps), the constant becomes 13. Therefore, for a nominal mission with all chutes deployed, the number of unbalanced rockets fired for horizontal deceleration, plus the number of balanced rockets fired simultaneously for vertical deceleration, must always equal 12.

Two kinds of active rocket functions have been identified. The first is the $\theta$ pair, which provide an unbalanced horizontal force component that attenuates the horizontal vehicle velocity and also contributes to attenuation of the vertical velocity. These rockets fire in a symmetrical pattern about the line of horizontal motion. The second is the diametral or 180-degree pair which is balanced and contributes only to the attenuation of vertical velocity, with no effect on the horizontal. The 120-degree rocket triad is also a balanced grouping. Since the horizontal velocity component varies from zero to 53 fps, with the maximum being nearly twice the vertical velocity, attenuation of the horizontal velocity component drives the retrorocket system definition. The rockets are sized such that a chute or rocket failure would raise the vertical touchdown velocity to 5 FPS, but replacing a 180-degree balanced pair with a 120-degree balanced triad allows firing an additional rocket, thus maintaining the touchdown velocity at zero.

Preferred Embodiments

Referring to the drawings and the characters of reference marked thereon, FIG. 1 illustrates a top schematic view of the canted rockets utilized for the rocket deceleration system of the present invention, designated generally as 10. This embodiment involves the use of 24 canted rockets. In this schematic view of FIG. 1, lines 11, at 15° increments, denote rockets. Those rockets 11 with arrowheads denote active rockets and the remainder (without arrowheads) are available rockets. The FIG. 1 embodiment assumes zero wind velocity so only balanced 180° pairs of canted rockets are used. There is no horizontal velocity and no use (or need) of unbalanced $\theta$ pairs (as will be explained in detail below). Rocket deceleration system 10 comprises a first set of active canted rockets 11 for attenuating a horizontal velocity of the spacecraft 14 and a portion of the vertical velocity of the spacecraft 14. A second set of active canted rockets (with arrowheads) are utilized for attenuating the remainder of the vertical velocity. A third set of available canted rockets (without arrowheads) are available to attenuate a wide range of horizontal velocities, regardless of the vehicle roll about its vertical axis. The first set, second set, and third set of rockets form a ring and combine to form a total number of rockets being divisible by the numeral 6, each rocket being 180 degrees from an opposing rocket on the other side of the ring. The rockets are preferably identical and equally spaced around this ring. This pattern of rockets, thereby, consists of pairs in which the two rockets of each pair are 180 degrees apart. Also, for each rocket, there must be another at 120 degrees. Furthermore, all rockets should have the same cant angle, $\beta$, such that their thrust centerlines intersect at a common point. This common point can be most readily seen in FIG. 2, designated as 16. A bottom view of these 24 rockets 11 which combine to form a ring is illustrated in FIG. 3, and an enlarged view is shown as FIG. 4. (In this simple example, assuming no wind velocity, the number of rockets in the first set becomes zero.)

The rocket cant angle ($\beta$) and thrust force is such that the horizontal and vertical components are sufficient to attenuate the horizontal and vertical vehicle velocities, respectively, to zero, with selection of the appropriate firing pattern under computer control. A programmable controller 18 (see FIG. 2) receives external input data regarding horizontal and vertical spacecraft velocities and vehicle roll position. (As will be explained below, the input data is compared to tabulated information correlating rocket position to horizontal spacecraft velocity and vehicle roll position. The appropriate fire commands are issued).

The cant angle, $\beta$, and the rocket thrust force vector, $F_R$, is best seen in FIG. 5, where $F_{RH}$ is the horizontal component of the rocket thrust force and $F_{RV}$ is the vertical component of the rocket thrust force.

An example retrorocket configuration concept will be presented in abbreviated form, using the Apollo shape for the capsule, as illustrated in FIG. 2. Emphasis will be on a 24-rocket pattern that shows its potential for accommodating unanticipated anomalies and changes in vehicle weight, with selected data also given for an 18-rocket alternative.

EXAMPLE 1

Retrorocket attenuation of a range of horizontal and vertical velocities with a ring of 24 identical canted solid rockets—cant angle $\beta = 32.012°$.

A spacecraft weight of 15000 lb. is assumed. As an innovative cost reduction in control avionics and software, this is held constant by using an easily altered ballast attached to each crew couch. Each mission is thus always flown the same, also minimizing crew training and, perhaps most important, is ideally suited to a fixed solid retrorocket system. Descent velocities are given for three and two chutes at 30 and 35 fps, respectively. With the loss of two of the three chutes, this velocity increases to 50 fps. A 5 fps maximum horizontal and vertical touchdown velocity is allowed, but the invention provides substantially zero velocity, with a maximum tolerance of 2.5 fps, due to an unavoidable step function nature. This tolerance holds even with the loss of one or two chutes or rockets. Allowable touchdown decelerations are 2-G's horizontal and 10 vertical; the rockets in this example are sized for 1.75 and 1.99, respectively. The 1.75 allows for normal differences in thrust force and burn time; the 1.99 is driven by the 1.75 and identical burn time inherent in the concept, which uses the same rocket to attenuate both horizontal and vertical velocities.

Rocket sizing for this example is with the assumption of 24 rockets, using up to 10 for horizontal deceleration, depending on wind velocity. The 1.75-G limit and 53 fps wind define the maximum horizontal deceleration force, $F_H$, and firing time, t:

$$F_H = 1.75 \times 15000 \text{ lb.}_m = 26250 \text{ lb.}_f$$

$$t = (V_H W)/(F_H g) = (53 \text{ fps} \times 15000 \text{ lb.}_m)/(26250 \text{ lb}_f \times 32.2 \text{ fps}^2) = 0.9406 \text{ second}$$

where g is the acceleration of earth gravity. The vertical deceleration force, $F_V$, can now be found:

$$F_V = ((V_v/tg)+1)W = (30/(0.9406 \times 32.2)+1)15000 = 29858.5 \text{ lb}_f$$

The height above ground that deceleration begins is $$h = (V_v t)/2 = (30 \times 0.9406)/2 = 14.108 \text{ feet}$$

Since $V_v$ with a failed chute is 35 fps and the permissible touchdown tolerance is 5 fps, the difference between $F_v$ at $V_v = 30$ and 35 fps gives a value which, if set equal to the vertical thrust component of one rocket, allows firing one additional rocket, thus maintaining the touchdown velocity, $V_{VTD}$, at zero. As with a chute failure, this approach also means that the loss of one rocket increases the vertical touchdown velocity by 5 FPS, correctable in the same way as for chute failure, by firing one additional rocket:

$$F_{V35} = (35/(0.9406 \times 32.2)+1)15000 = 32334.9 \text{ lb}_f$$

$$F_{V35} - F_{V30} = 32334.9 - 29858.5 = 2476.4 \text{ lb}_f$$
difference

Dividing this difference into each of the two forces, $F_{V30}$ and $F_{V35}$, yields very nearly integer values for the number of active rockets required: 12.6 and 13.06, respectively. Dropping the remainders and redividing as before gives a corrected difference of 2488 lb$_f$ to be used in the remaining analysis. It remains only to find the horizontal thrust, $F_{RH}$, in order to size the rocket and define the cant angle, $\beta$. The rockets are radially disposed, as indicated by the ten arrows labeled 36 in FIG. 6, so it is necessary to find the windward component of each rocket and set their sum equal to the required maximum value of 26250 lb$_f$:

$$F_H = 26250 \text{ lb}_f = 2F_{RH} \sin(75 + 60 + 45 + 30 + 15) =$$

$$2F_{RH} \, 3.297887 = 6.595754 \, F_{RH}$$

$$F_{RH} = 3979.83 \text{ lb}_f$$

$$F_R = (F_{RV}^2 + F_{RH}^2)^{\frac{1}{2}} = (2488^2 + 3980^2)^{\frac{1}{2}} = 4894 \text{ lb}_f \text{ axial thust}$$

-continued $\beta = \arcsin 2488/4694 = 32.01° = $ cant angle with the horizontal There is now sufficient data with which to construct a table which will be stored in computer memory:

TABLE 1

24 ROCKET DECELERATION SYSTEM, ROCKET SELECTION TABLE FOR NOMINAL MISSION CONFIGURATION OF FIG. 1

| θ PAIRS (DEGREES) | 180° PAIRS | $F_H$ LB$_f$ | $-a$ FPS$^2$ | $V_H$ FPS |
|---|---|---|---|---|
| 15 | 0 ± 30 ± 45 | 2060 | 4.422 | 4.160 |
| 30 | 0 ± 15 ± 60 | 3980 | 8.544 | 8.036 |
| 45 | 0 ± 15 ± 75 | 5628 | 12.082 | 11.364 |
| 60 | 0 ± 15 ± 45 | 6893 | 14.798 | 13.918 |
| 75 | 0 ± 15 ± 45 | 7688 | 16.505 | 15.524 |
| 45 + 30 | ±15 ± 75 | 9608 | 20.626 | 19.400 |
| 75 + 30 | ±15 ± 45 | 11668 | 25.058 | 23.559 |
| 75 + 45 | ±15 ± 30 | 13317 | 28.587 | 26.888 |
| 75 + 45 + 15 | 0 ± 60 | 15377 | 33.010 | 31.047 |
| 75 + 45 + 30 | 0 ± 60 | 17297 | 37.131 | 34.923 |
| 75 + 60 + 30 | 0 ± 15 | 18562 | 39.846 | 37.477 |
| 75 + 60 + 34 | 0 ± 15 | 20210 | 43.385 | 40.806 |
| 75 + 60 + 45 + 15 | ±30*** | 22270 | 47.807 | 44.965 |
| 75 + 60 + 45 + 30 | ±15 | 24190 | 51.928 | 48.841 |
| 75 + 60 + 45 + 30 + 15 | 0 | 26250 | 56.350 | 53.000 |

Given the necessary flight data, such as wind (horizontal) velocity, and vehicle roll position about its vertical axis with respect to the wind vector, the computer takes the nearest horizontal velocity, $V_H$, from Table 1 and fires the corresponding θ pairs, plus the 180-degree balanced pairs needed to total 12 active rockets (13 for a failed chute). The code identifying rocket positions is understood by comparing θ in Table 1 with FIG. 1. For example, a θ of −30 defines the two −30-degree positions shown. −60+10 defines the two −60 and two +30-degree positions shown.

Table 1 shows, for a 24-rocket system, the corresponding unbalanced θ pairs and balanced 180-degree's required for the corresponding horizontal velocity, $V_H$, shown in the Table. The 24-rocket system can satisfy the entire range of wind velocities. Table 2 is for 18 rockets, allowing comparison with the 24 in Table 1. Performance for the 18-rocket system begins to drop slightly at about 43 fps.

TABLE 2

18 ROCKET DECELERATION SYSTEM, ROCKET SELECTION FOR NOMINAL MISSION, 6 FORWARD FIRING ROCKETS AT $V_H$ MAXIMUM (FOR COMPARISON WITH 24 ROCKETS IN TABLE 1)

| θ DEGREES | $F_H$ LB$_f$ | $-a$ FPS$^2$ | $V_H$ FPS |
|---|---|---|---|
| 10 | 2425 | 5.207 | 4.897 |
| 30 − 10 | 4558 | 9.785 | 9.203 |
| 30 | 6984 | 14.992 | 14.101 |
| 30 + 10 | 9409 | 20.198 | 18.201 |
| 50 | 10700 | 22.969 | 21.603 |
| 70 | 13125 | 28.175 | 26.500 |
| 50 + 30 − 10 | 15258 | 32.754 | 30.807 |
| 50 + 30 | 17683 | 37.961 | 35.704 |
| 70 + 30 | 20109 | 43.167 | 40.601 |
| *70 + 50 − 10 | 21399 | 45.938 | 43.225 |
| *70 + 50 | 23825 | 51.144 | 48.104 |
| *70 + 50 + 10 | 26250 | 56.351 | 53.000 |

*1 CHUTE FAILURE: $V_{VTD} = 5 FPS (V_{HTD} = 0)$

EXAMPLE 2

Reducing the Misalignment Between Deceleration and Wind Vectors:

Issue: Lateral drift due to misalignment between ACRV deceleration and wind vectors.

Solution: Rotate control program through half-angle, λ/2

Figures 4A, 4B:
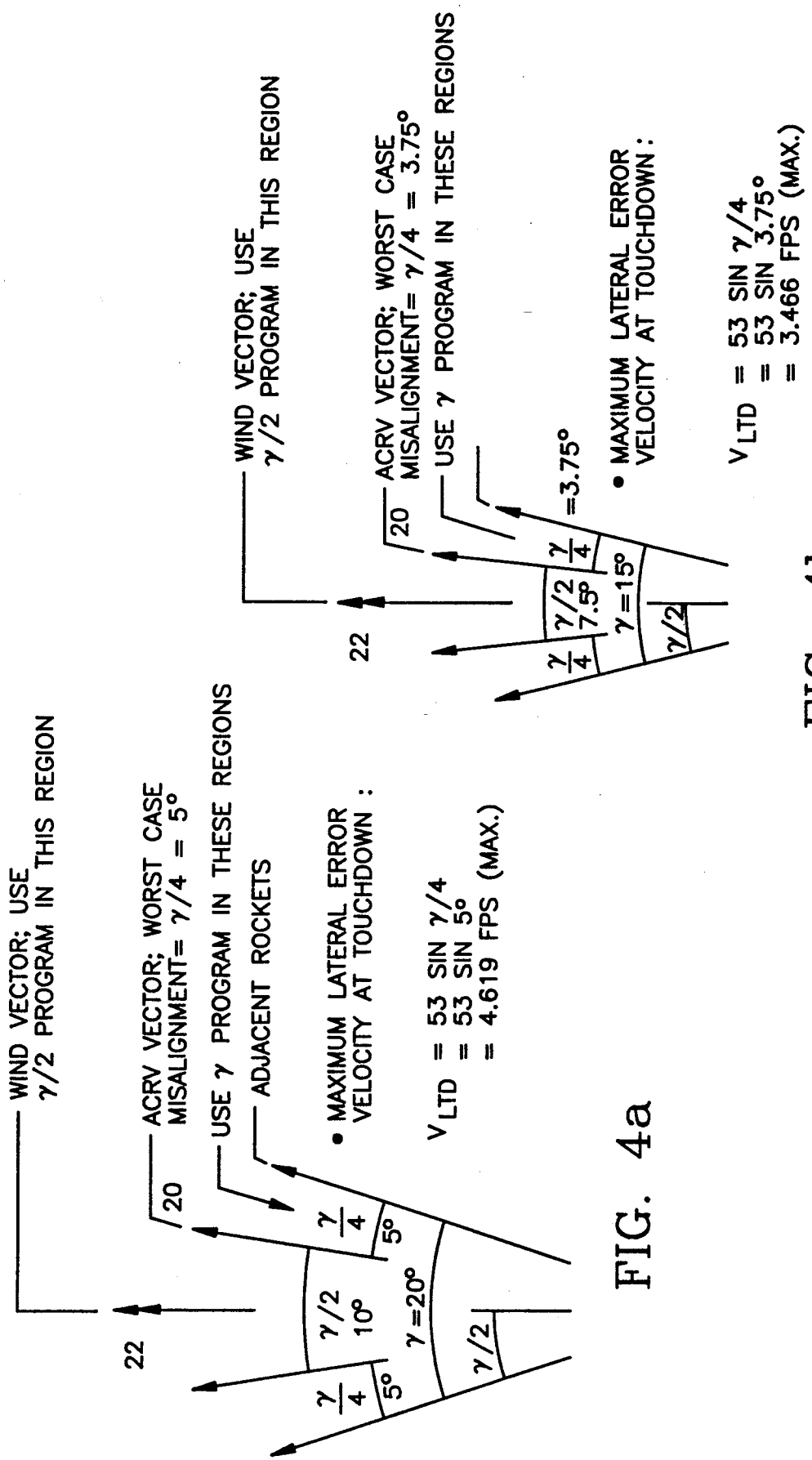
FIG. 4A is a schematic illustration of a method for rotating the computer table, by one half of rocket spacing of an 18-rocket system to minimize lateral drift errors at touchdown.
FIG. 4B illustrates such a computer method for a 24-rocket system.

In sizing the rockets and selecting the firing pattern to attenuate horizontal and vertical velocities, in the above examples it was assumed that the resultant rocket deceleration vector and the wind vector were colinear. Tables 1 (24 rockets) and 2 (18 rockets) are based on this assumption and are identified as λ tables, where λ is the angular spacing between rockets (15 degrees for the 24-rocket arrangement for example). However, since roll angle is known but not controllable, a maximum misalignment between the two vectors of up to 7.5 degrees could exist for the 24-rocket system, causing the vehicle to drift laterally with respect to the wind. This lateral touchdown velocity, $V_{LTD}$, is a sine function of the wind velocity and misalignment angle, for which the maximum is $$V_{LTD} = V_H \sin \lambda/2 = 53 \sin 7.5° = 6.9179 \text{ FPS}$$

which exceeds the allowable of 5 FPS. The 6.9179 value can be approximately halved by assuming the vehicle to be positioned at the 7.5° mark and developing a new table based on the new position of 7.5 degrees away from the λ table. Since the maximum error in the λ table is 7.5 degrees, or λ/2, the new table is identified as a λ/2 table. This procedure results in a maximum error of 3.75 degrees, or λ/4, between the two vectors, with the maximum lateral touchdown velocity now reduced to $$V_{LTD} = 53 \sin 3.75° = 3.466 \text{ FPS},$$

which is within the required 5 FPS. FIGS. 4a and 4b illustrate the misalignment between the resultant horizontal component of rocket thrust (horizontal deceleration force vector 20) and wind vector 22, for 18 and 24-rocket arrangements, respectively. Tables 3a and 3b show the corresponding λ/2 tables. If the misalignment is exactly λ/4, either table may be used. If less, the λ table is used. If more, the λ/2 table is used.

TABLE 3A

HALF ANGLE (ν/2) ROCKET SELECTION FOR FIG. 4A (18-ROCKET SYSTEM), WHICH MINIMIZED LATERAL DRIFT VELOCITY ERRORS AT TOUCHDOWN

| θ DEGREES | $F_H$ LB$_f$ | $-a$ FPS$^2$ | $V_H$ FPS |
|---|---|---|---|
| 80 + 60 | 1414 | 3.035 | 2.854 |
| 20 | 4070 | 8.738 | 8.218 |
| 60 − 20 | 6236 | 13.387 | 12.591 |
| 40 | 7650 | 16.422 | 15.445 |
| 60 | 10306 | 22.125 | 20.809 |
| 80 | 11720 | 25.159 | 23.664 |
| 60 + 20 | 14377 | 30.862 | 29.028 |
| 80 + 20 | 15790 | 33.897 | 31.882 |
| 60 + 40 | 17956 | 38.546 | 36.255 |
| 80 + 40 | 19370 | 41.581 | 39.109 |
| 80 + 60 | 22026 | 47.284 | 44.473 |
| *80 + 40 + 20 | 23440 | 50.319 | 47.327 |
| *80 + 60 + 20 | 26097 | 56.022 | 52.691 |

*$V_{VTD}$ = 5FPS AT 345 PFS (2 CHUTES)

TABLE 3B

HALF ANGLE (ν/2) ROCKET SELECTION FOR FIG. 4B (18-ROCKET SYSTEM), WHICH MINIMIZED LATERAL DRIFT VELOCITY ERRORS AT TOUCHDOWN

| θ DEGREES | $F_H$ LB$_f$ | $-a$ FPS$^2$ | $V_H$ FPS |
|---|---|---|---|
| 7.5 | 1039 | 2.230 | 2.098 |
| 22.5 | 3046 | 6.539 | 6.150 |
| 37.5 | 4846 | 10.402 | 9.784 |
| 52.5 | 6315 | 13.556 | 12.750 |
| 67.5 | 7354 | 15.786 | 14.848 |
| 82.5 | 7892 | 16.941 | 15.934 |
| 82.5 + 7.5 | 8931 | 19.171 | 18.031 |
| 82.5 + 22.5 | 10938 | 23.480 | 22.084 |
| 82.5 + 37.5 | 12737 | 27.343 | 25.717 |
| 82.5 + 52.5 | 14305 | 30.709 | 28.684 |
| 82.5 + 67.5 | 152.45 | 32.727 | 30.782 |
| 67.5 + 52.5 + 22.5 | 16715 | 35.881 | 33.748 |
| 67.5 + 52.5 + 37.5 | 18514 | 39.744 | 37.382 |
| 82.5 + 67.5 + 37.5 | 20091 | 43.129 | 40.565 |
| 82.5 + 67.5 + 52.5 | 21560 | 46.283 | 43.532 |
| 82.5 + 67.5 + 52.5 + 7.5 | 22599 | 48.514 | 45.629 |
| *82.5 + 67.5 + 52.5 + 22.5 | 24606 | 52.822 | 49.682 |
| *82.5 + 67.5 + 52.5 + 37.5 | 26406 | 56.685 | 53.315 |

*$V_{VTD}$ = 5FPS AT $V_V$ = 35 FPS(2 CHUTES)

EXAMPLE 4

Reducing the Tilting Moment Due to Vehicle CG Travel:

Issue: Unbalanced moment due to vehicle CG vertical displacement during propellant usage.

Solution: Position thrust vector intersect point at mid-point of CG Travel.

During retrorocket burn, vehicle weight is reduced by the amount of propellant used (always the same for a nominal touchdown). However, rocket location and the number of unbalanced θ pairs used to attenuate horizontal velocity cause the CG to move away from where the weight loss occurs. Resolving this movement into vertical and horizontal components, vertical movement is nearly the same for any landing, since the total number of active rockets is always the same; horizontal movement is primarily driven by the number of these rockets used for horizontal deceleration, since they are mostly grouped on the windward side of the vehicle.

Figure 5A:
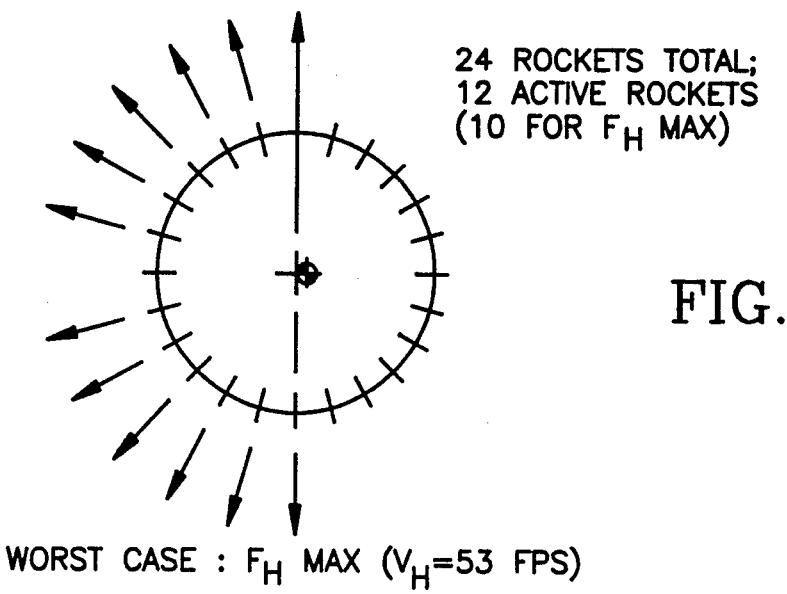
FIG. 5A illustrates a top view of a 24-rocket system in a maximum wind.
Figure 5B:
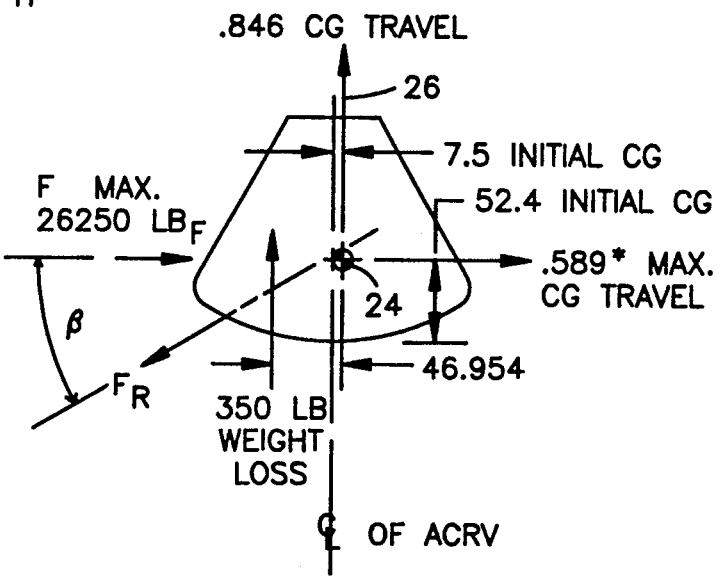
FIG. 5B is a side view of a spacecraft, illustrating the movement of the center of gravity during rocket fuel consumption.
Figure 5C:
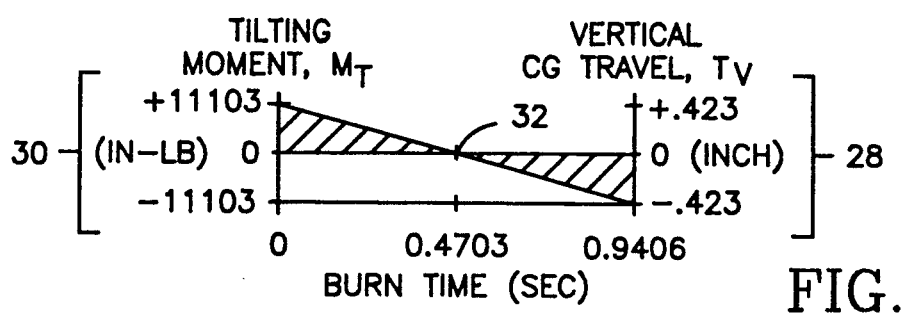
FIG. 5C is a tilting moment diagram for the rocket deceleration system of FIGS. 5A and 5B.

A method for minimizing the tilting moments induced by the CG 24 migration 26 which is caused by propellant consumption by the solid rockets is shown in FIGS. 5a–5c. The horizontal decelerating force (the maximum of 26250 lb$_f$ is shown) is positioned by canting the rocket thrust axes such that they initially intersect just above the CG 24 by an amount equal to one half the total vertical CG travel (0.846/2 = ±0.423 inch shown). As the CG rises, 30, it passes near or through the thrust intersection, causing the tilting moment to drop to or near zero, designated 32 in the Figure, reverse sign, and then increase to the initial (but opposite) value. The Figure shows a 24-rocket arrangement, but the approach is usable with 18 rockets.

EXAMPLE 5

Sensitivity of Retrorockets to Changes In Mission Requirements.

Issue: Change in descent velocities due to change in 24-rocket, 15000 L$_m$ ACRV weight.

Solution: Change the number of active rockets ($V_{HTD}$=zero).

There is a tendency in most vehicle development programs for changes in design and mission requirements. Weight generally increases; the number, type, or area of parachutes could change, affecting descent velocity. The retrorocket system design, however, may be well along, since a new design may mean long lead times. The vehicle may be operational but faced with a new mission that adds weight.

A key feature of this invention is the capability for firing an additional rocket to compensate for a failed chute, with no change in performance. This capability can be extended to programmatic changes, such as vehicle weight or descent velocity, as shown in Table 4. For each of three vehicle weights, including the nominal 15000 lb$_m$, four descent velocities are evaluated. For all cases, the horizontal touchdown velocity is zero, but maximum wind velocity, $V_H$MAX. in some cases, is restricted. In all cases, for any lower wind speeds, both vertical and horizontal velocities can be attenuated to zero with the same resolution as baseline. Only the 24-rocket arrangement is shown.

TABLE 4

SENSITIVITY OF ATTENUATION SYSTEM TO CHANGES IN SPACECRAFT WEIGHT AND DESCENT VELOCITY

| $W_{ACRV}$ LB$_m$ | $V_V$ FPS | $V_{VTD}$ FPS | TIME TO TD, SEC | $V_H$ MAX FPS | $F_V$ REQD LB$_f$ | $F_V$ AVAIL. LB$_f$ | ACTIVE ROCKETS | $F_H$ MAX LF$_f$ | MAX θ PAIRS DEGREES | $G_V$ DECEL. | $G_H$ MAX | $h_o$ FEET |
|---|---|---|---|---|---|---|---|---|---|---|---|---|
| 10000 | 25 | 2.827 | .9406 | 34.923 | 18255 | 17416 | 7 | 17297 | 75 + 45 + 30 | 1.825 | 1.730 | 13.087 |
|  | 30 | 0 | .9406 | 34.923 | 19906 | 19906 | 8 | 17297 | 75 + 45 + 30 | 1.991 | 1.730 | 14.108 |
|  | 35 | 0 | .8771* | 34.923 | 21557* | 22392* | 9 | 17297 | 75 + 45 + 30 | 2.239 | 1.730 | 15.350 |
|  | 40 | 2.476 | .9406 | 34.923 | 23208 | 22392 | 9 | 17297 | 75 + 45 + 30 | 2.239 | 1.730 | 20.049 |
| 15000 | 25 | 0 | .9406 | 48.841 | 27382 | 27368 | 11 | 24190 | 75 + 60 + 45 + 30 | 1.825 | 1.613 | 11.757 |
| ** | 30 | 0 | .9406 | 53.000 | 29858 | 29858 | 12 | 26250 | 75 + 60 + 45 + 30 + 15 | 1.991 | 1.750 | 14.108 |
| ** | 35 | 0 | .9406 | 53.000 | 32335 | 32344 | 13 | 26250 | 75 + 60 + 45 + 30 + 15 | 2.156 | 1.750 | 16.460 |
|  | 40 | 0 | .9406 | 53.000 | 34811 | 34832 | 14 | 26250 | 75 + 60 + 45 + 30 + 15 | 2.322 | 1.750 | 18.811 |
| 20000 | 25 | 2.659 | .9406 | 53.000 | 36509 | 34832 | 14 | 26250 | 75 + 60 + 45 + 30 + 15 | 2.322 | 1.313 | 13.087 |
|  | 30 | 0 | .9406 | 48.841 | 39811 | 39808 | 16 | 24190 | 75 + 60 + 45 + 30 | 1.991 | 1.210 | 14.108 |
|  | 35 | 1.283 | .9406 | 40.806 | 43113 | 42296 | 17 | 20210 | 75 + 60 + 45 | 2.115 | 1.011 | 17.063 |
|  | 40 | 2.476 | .9406 | 40.806 | 46415 | 44784 | 18 | 20210 | 75 + 60 + 45 | 2.239 | 1.011 | 20.049 |

*ACRV DECELERATES TO ZERO IN 0.8771 SEC; BURN CONTINUES 0.0635 SEC AFTER TOUCHDOWN AT $V_{VTD}$ = 0
**NOMINAL BASELINE PERFORMANCE FOR THREE AND TWO CHUTES

EXAMPLE 6

Chute Failure Without Performance Degradation

Issue: Descent velocity increased from 30 to 35 FPS.

Solution: Increase the number of active rockets from 12 to 13.

Figure 1A:
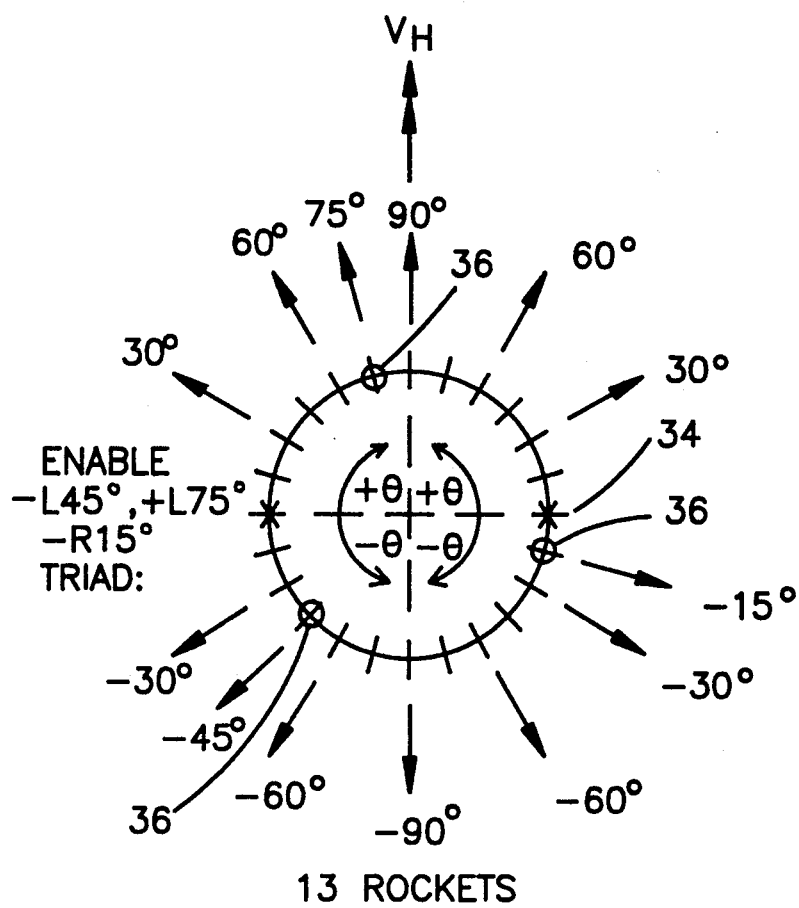
FIG. 1A is a top view schematic illustration of a 24-rocket configuration showing a chute failure, with 13 active rockets and 11 available rockets.

FIG. 1 shows the 12-rocket firing pattern at zero horizontal velocity for a nominal mission. All six pairs are therefore balanced. FIG. 1A adds a chute failure to FIG. 1, thus requiring an additional active rocket, for a total of 13. This is accomplished by replacing the balanced 180-degree pair at the zero-degree position 34, with a balanced 120-degree triad 36, of rockets at 75 degrees (shown left of the horizontal valocity vector, $V_H$), −30 degrees, and −45 degrees. Tables 1 and 1A identify the rockets to be fired for a corresponding horizontal velocity, assuming no chute failure and one chute failure, respectively.

TABLE 1A

ONE CHUTE FAILURE FOR 24 ROCKET DECELERATION SYSTEM OF FIG. 1A

| θ PAIRS (DEGREES) | 180° PAIRS AND 120° TRIADS | $V_H$ FPS |
|---|---|---|
| 15 − 30 | ±60 ± 45 + 90/2 | 4.160 |
| 30 − 30 | ±15 ± 60 + 90/2 | 8.036 |
| 45 − 30 | ±15 ± 75 + 90/2 | 11.364 |
| 60 − 30 | ±15 ± 45 + 90/2 | 13.918 |
| 75 − 30 | ±15 ± 45 + 90/2 | 15.524 |
| 45 + 30 − 30 | 0 ± 15 + 90/2 | 19.400 |
| 75 + 30 − 30 | 0 ± 15 + 90/2 | 23.559 |
| 75 + 45 − 30 | 0 ± 15 + 90/2 | 26.888 |
| 75 + 45 + 30 + 15 | ±60 + 90/2 | 31.047 |
| 75 + 45 + 30 − 30 | ±60 + 90/2 | 34.923 |
| 75 + 60 + 30 − 30 | ±15 + 90/2 | 37.477 |
| 75 + 60 + 45 + 30 | ±15 − 90/2 | 40.806 |
| 75 + 60 + 45 − 30 + 15 | 0 + 90/2 | 44.965 |
| 75 + 60 + 45 + 30 − 30 | 0 + 90/2 | 48.841 |
| 75 + 60 + 45 + 30 − 30 + 15 | 90/2 | 53.000 |

Figure 6:
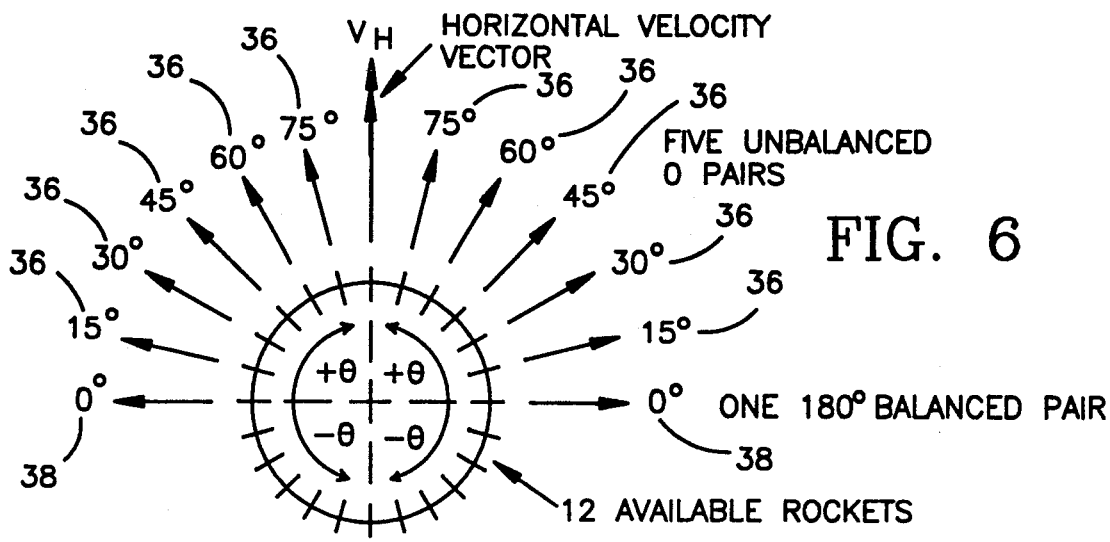
FIG. 6 illustrates a rocket deceleration system utilizing 24 rockets in a maximum wind.
Figure 6A:
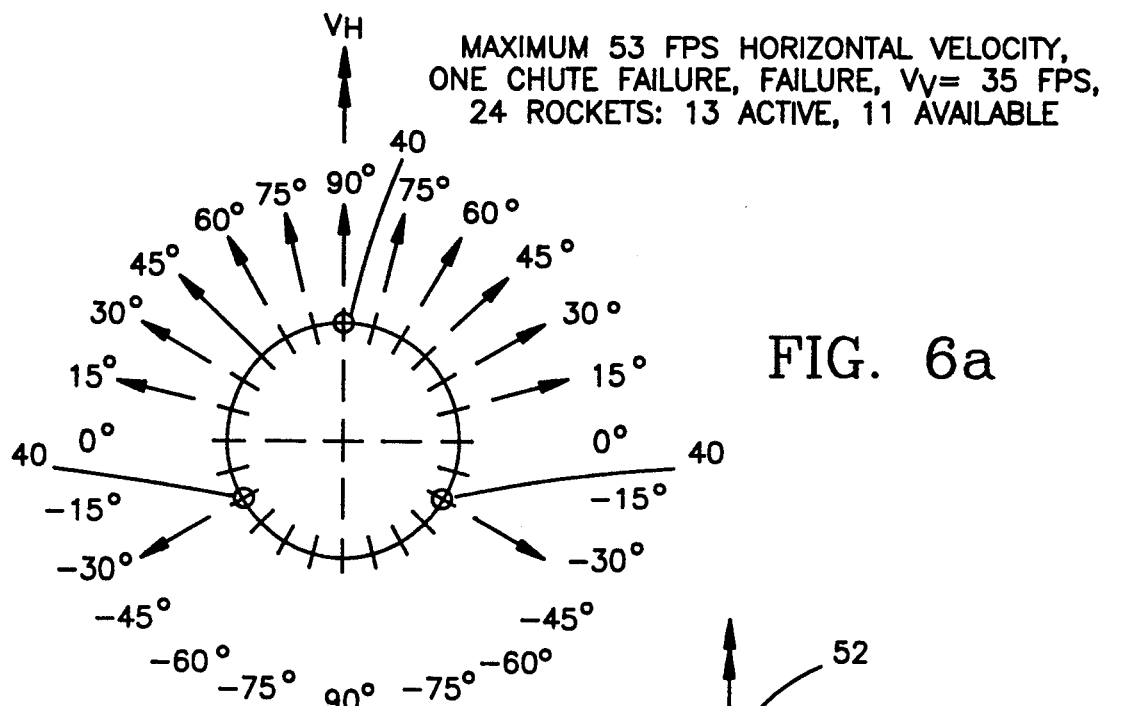
FIG. 6A illustrates the FIG. 6 embodiment with a failed parachute.

FIG. 6 shows the 12-rocket firing pattern at the maximum 53 FPS wind velocity 34. There are five unbalanced θ-pairs of rockets 36 at 15 through 75 degrees, and one balanced 180-degree pair 38 at the zero-degree position. FIG. 6A adds a chute failure to the embodiment of FIG. 6, thus requiring 13 active rockets to attenuate a 35 FPA descent velocity. This is accomplished by replacing the balanced 180-degree pair 38 at the zero-degree position, with a balanced 120-degree triad 40 at the 90-degree position and the two minus 30-degree positions. Tables 1 and 1A identify these same rockets, assuming no chute failure and one chute failure, respectively.

Figure 7:
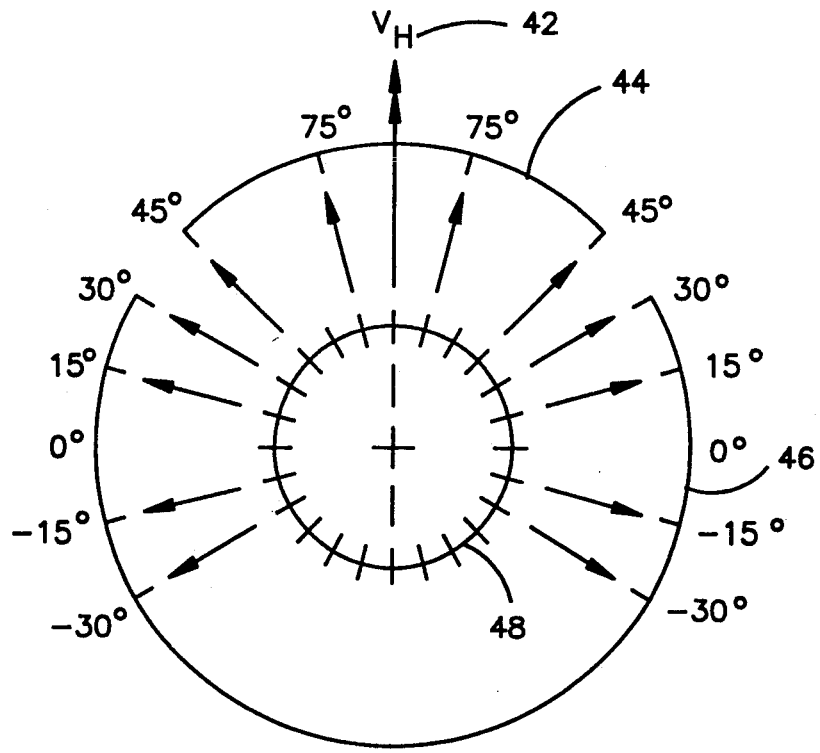
FIG. 7 illustrates a rocket deceleration system utilizing 24 rockets in a moderate wind.

FIG. 7 shows the firing pattern for a moderate horizontal velocity 42 of 26.888 FPS. This pattern clearly shows the three sets of rockets, generally designated as 44, 46 and 48, comprising the total of 24: (1) unbalanced θ-pairs 44, (2) balanced 180-degree pairs 46, (the balanced 120-degree is not shown), and (3) available rockets 48. The first two sets add up to 12 active rockets as can be clearly seen in the Figure. Only two unbalanced θ-pairs of 4 rockets 44 are required for this nominal mission. Four balanced 180-degree pairs 46 at ±15 and ±30 degrees provides the other 8 active rockets.

Figure 7A:
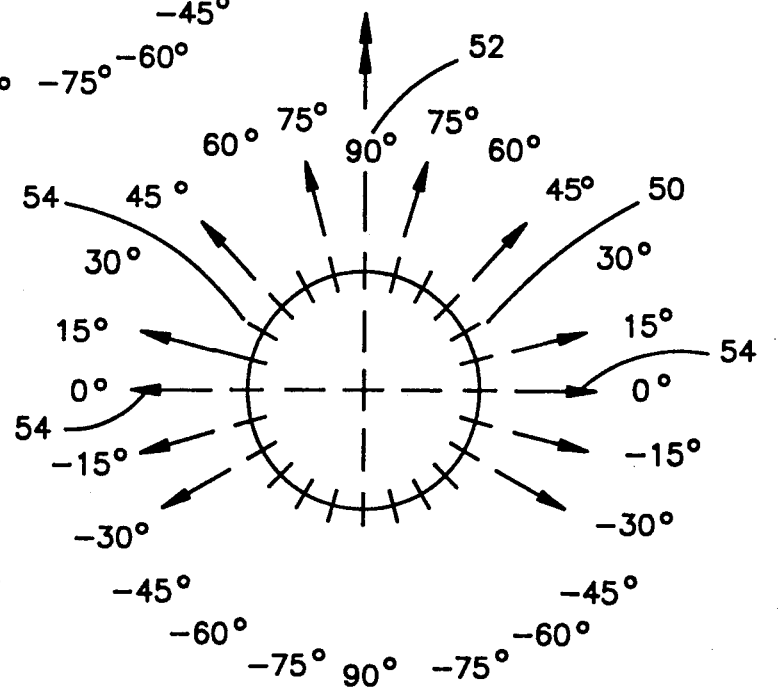
FIG. 7A is similar to the FIG. 7 embodiment, however it includes a one-chute failure.

The embodiment of FIG. 7A adds a failed chute to the embodiment of FIG. 7. To obtain the additional 13th rocket, the unbalanced θ-pair 50 at 30 degrees was replaced by one rocket 52 at 90 (one at 90 equals two at 30), and one balanced θ-pair 54 was added at zero degrees. Tables 1 and 1A identify the rockets to be fired for a range of horizontal velocities, including this example velocity of 26.888 FPS, assuming no chute failure and one chute failure, respectively.

EXAMPLE 7

Rocket Failure With Reduced Degradation In Performance.

Issue: Single rocket failure reduces attenuation below that required (24-rocket concept; $\beta = 32.012°$).
Solution: Fire nearest available rocket.

Solid rockets are believed to be so reliable that provisions for such a contingency are often not a design requirement. Failures, however, have occurred, and since this invention can respond, an innovative approach has been developed to handle such failures. The general solution is to fire the nearest available rocket, analysis of the 24-rocket system showing that, in order to be useful, the angle; $\phi$, between the failed and fired rockets be less than 60 degrees (15, 30, or 45 degrees).

Table 5 shows worst case failure and available rocket locations. All failure locations not mentioned have adjacent available rockets, i.e., 15 degrees away, resulting in a horizontal touchdown velocity of 2.098 FPS. The maximum velocity is 6.150 FPS, at wind velocities above 40 FPS. In all cases, vertical touchdown velocity is zero. Without this innovation, vertical touchdown is 5 FPS and horizontal is at least 6.884.

TABLE 5

Single Rocket Failure Compensation, 24-rocket Deceleration System, SINGLE ROCKET FAILURE: 30 FPS (3 CHUTES)*

θ LOCATIONG FOR WORST CASE

| FAILED ROCKET | AVAILABLE ROCKET | $\phi$ DEGREES | $V_{HTD}$ FPS |
|---|---|---|---|
| 15/2 OR 30/2 | −15/2 OR 60/2 | 30 | 4.159 |
| 0/2 OR 15/2 | −30/2 OR 45/2 | 30 | 4.159 |
| 0/2 | 30/2 OR −30/2 | 30 | 4.159 |
| 0/2 | 30/2 OR −30/2 | 30 | 4.159 |
| 0/2 | 30/2 OR −30/2 | 30 | 4.159 |
| 30/2 | 60/2 OR 0/2 | 30 | 4.159 |
| 30/2 | 50/2 OR 0/2 | 30 | 4.159 |
| 30/2 | 60/2 OR 0/2 | 30 | 4.159 |
| 60/2 | 90/2 OR 30/2 | 30 | 4.159 |
| 60/2 OR 45/2 | 90/2 OR 15/2 | 30 | 4.159 |
| 15/2 OR 0/2 | 45/2 OR −30/2 | 30 | 4.159 |
| 60/2 OR 0/2 | 30/2 | 30 | 4.159 |
| 45/2 | 90/2 OR 0/2 | 45 | 6.150 |
| 45/2 | 90/2 OR 0/2 | 45 | 6.150 |
| 30/2 OR 45/2 | −15/2 OR 90/2 | 45 | 6.150 |

Figure 8:
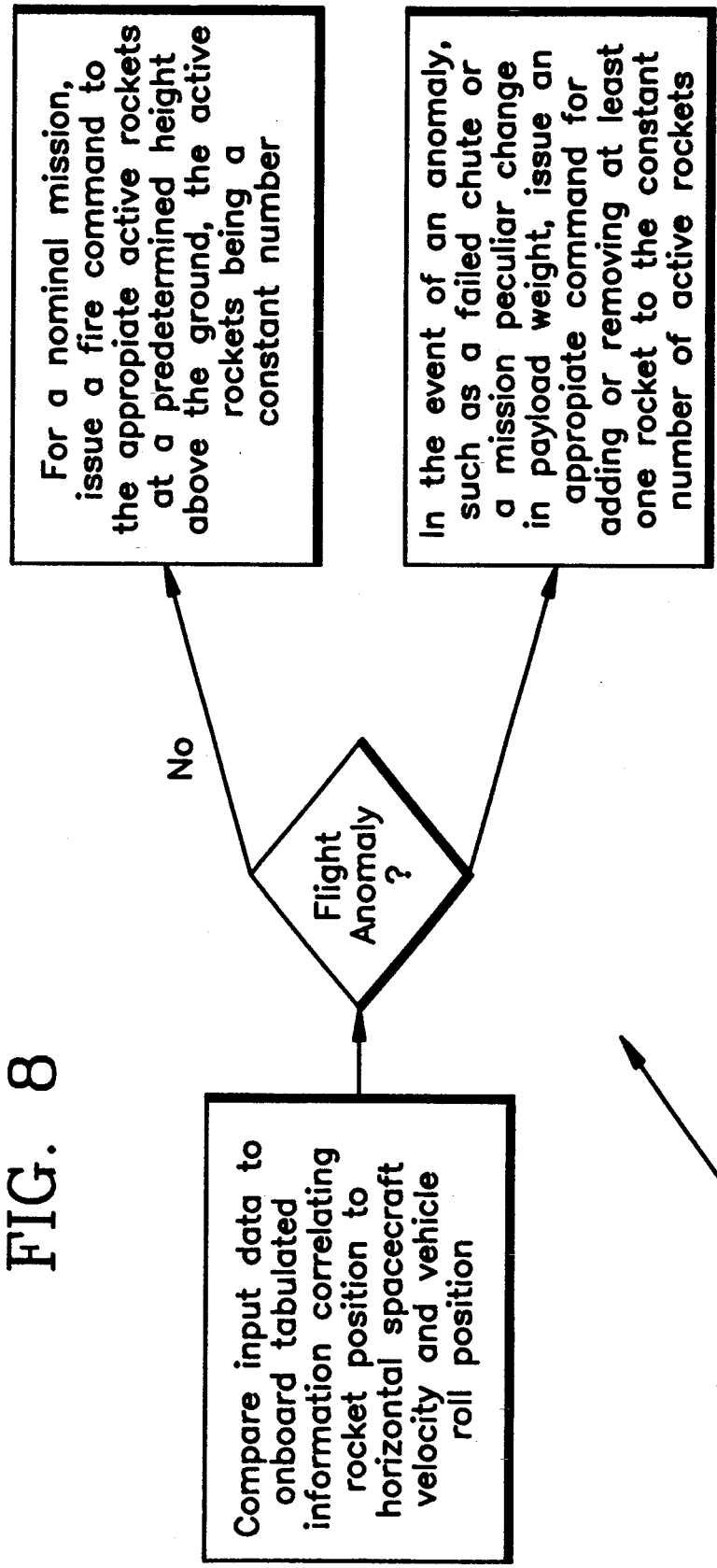
FIG. 8 is a simplified block diagram of the programmable controller of the present invention.

FIG. 8 is a block diagram illustrating the operation of the programmable controller 18.

Obviously, many modifications and variations of the present invention are possible in light of the above teachings. It is therefore to be understood that, within the scope of the appended claims, the invention may be practived otherwise than as specifically described.

What is claimed and desired to be secured by Letters Patent of the United States is:

1. A rocket deceleration system for a spacecraft, comprising:
   a) a first set of active canted rockets for attenuating a horizontal velocity of said spacecraft and a portion of the vertical velocity thereof;
   b) a second set of active canted rockets for attenuating the remainder of the vertical velocity,
   c) a third set of available canted rockets for attenuating a wide range of horizontal velocities, regardless of the vehicle roll position about its vertical axis, said first set, second set and third set of rockets forming a ring and combining to form a total number of rockets being divisible by the numeral 6, each rocket being 180° from an opposing rocket on the other side of said ring; and,
   d) a programmable controller for identifying rockets to be fired to attenuate horizontal and vertical spacecraft velocities, said controller operating in the following steps:

i) receiving external input data regarding horizontal and vertical spacecraft velocities and vehicle roll position;

ii) comparing said input data to tabulated information correlating rocket position to horizontal spacecraft velocity and vehicle roll position;

iii) issuing a fire command to the appropriate active rockets of said first set and second set at a predetermined height above the ground, said appropriate active rockets being a constant number if there are no flight anomalies; and, iv) issuing an appropriate command for adding or removing at least one rocket to said constant number of active rockets without inducing undesired inbalances in thrust forces on said spacecraft.

2. The rocket deceleration system of claim 1 wherein said first set, second set and third set of canted rockets are substantially identical in thrust and firing time.

3. The rocket deceleration system of claim 1 wherein the cant angles of said first, second and third set of canted rockets are equal so that the thrust centerlines thereof intersect at a common point, said common point generally being located or near the center of mass of said spacecraft, wherein as the center of mass moves, due to the loss of propellent mass, said center of mass moves through said intersect point to a final location whose distance from said intersect point equals that of its initial location, thereby reducing by one-half, the instability torques on said spacecraft, due to misalignments between thrust forces and said center-of-mass.

4. The rocket deceleration system of claim 1 wherein:

a) said first set of canted rockets comprise unbalanced pairs of rockets symmetrically disposed about the vehicle's horizontal velocity vector, said unbalanced pairs not being balanced by active rockets 180° away;

b) said second set of canted rockets comprise opposed rocket pairs 180° apart, said second set being balanced; and, c) said third set of canted rockets comprise sufficient additional rockets so arranged and constructed to provide:

i) the maximum allowable spacing between rockets, to ensure that misalignment between said horizontal thrust vector of said unbalanced pair of rockets and said vehicle velocity vector is small enough to keep horizontal touchdown velocity errors within acceptable limits, and ii) the minimum number of rockets from which to select cooperating sets of said unbalanced and balanced rockets, thereby producing sufficiently small horizontal velocity increments that result in zero touchdown velocities, such that maximum touchdown errors of one-half of said velocity increments are within acceptable limits.

* * * * *